United States Patent
Murugesan

(10) Patent No.: US 9,606,903 B2
(45) Date of Patent: Mar. 28, 2017

(54) UNIT TEST AUTOMATION FOR BUSINESS RULES AND APPLICATIONS

(71) Applicant: PAYPAL, INC., San Jose, CA (US)

(72) Inventor: Ilangovan Murugesan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/451,244

(22) Filed: Aug. 4, 2014

(65) Prior Publication Data

US 2015/0356001 A1    Dec. 10, 2015

Related U.S. Application Data

(60) Provisional application No. 62/009,071, filed on Jun. 6, 2014.

(51) Int. Cl.
G06F 9/44 (2006.01)
G06F 11/36 (2006.01)
G06Q 10/00 (2012.01)

(52) U.S. Cl.
CPC ...... *G06F 11/3688* (2013.01); *G06F 11/3684* (2013.01); *G06Q 10/00* (2013.01)

(58) Field of Classification Search
None
See application file for complete search history.

(56) References Cited

U.S. PATENT DOCUMENTS

| | | | | |
|---|---|---|---|---|
| 7,844,036 B2* | 11/2010 | Gardner | ............. | G06F 8/34 |
| | | | | 379/88.08 |
| 2002/0039352 A1* | 4/2002 | El-Fekih | ............. | H04L 12/14 |
| | | | | 370/252 |
| 2002/0120917 A1* | 8/2002 | Abrari | ............. | G06F 8/10 |
| | | | | 717/110 |
| 2003/0229884 A1* | 12/2003 | Carr | ............. | G06F 17/30306 |
| | | | | 717/101 |

(Continued)

OTHER PUBLICATIONS

NPL—Business Rules Group-Defining Business Rules—2001 Located at: http://www.businessrulesgroup.org/first_paper/br0lc5.htm.*

(Continued)

*Primary Examiner* — Wei Zhen
*Assistant Examiner* — Hossain Morshed
(74) *Attorney, Agent, or Firm* — Haynes and Boone, LLP

(57) ABSTRACT

There are provided systems and method for unit test automation for business rules and applications. A service provider, such as a payment provider, may wish to integrate software and platforms offered by Pegasystems, Inc., in particular Pega RULES Process ("PRPC"), which offers a business process management system. PRPC allows the service provider to create and manage business rules and build business applications and platforms, such as a customer support platform. In order to provide a more flexible and comprehensive automated unit testing mechanism, a Java framework may be utilized that runs test cases in PRPC for the business rules. The Java framework may feed data into test cases and may enable dynamic data to be entered for (Continued)

the test cases. Additionally, the Java framework may allow for editing of data for the PRPC test cases and may allow the test cases to be reused and deleted.

19 Claims, 4 Drawing Sheets

(56) References Cited

U.S. PATENT DOCUMENTS

| | | | |
|---|---|---|---|
| 2005/0256665 A1* | 11/2005 | Hartmann | G06F 11/3688 702/121 |
| 2006/0010426 A1* | 1/2006 | Lewis | G06F 11/3684 717/124 |
| 2006/0190310 A1* | 8/2006 | Gudla | G06Q 10/04 705/7.11 |
| 2007/0088668 A1* | 4/2007 | Larab | G06Q 10/10 |
| 2007/0277158 A1* | 11/2007 | Li | G06F 8/24 717/135 |
| 2008/0016499 A1* | 1/2008 | Jones | G06F 11/3688 717/124 |
| 2008/0059437 A1* | 3/2008 | Nagappan | G06F 17/30539 |
| 2008/0086348 A1* | 4/2008 | Rao | G06Q 10/063 705/7.11 |
| 2008/0282231 A1* | 11/2008 | R | G06F 11/3684 717/127 |
| 2009/0307763 A1* | 12/2009 | Rawlins | G06F 9/44505 726/5 |
| 2011/0321012 A1* | 12/2011 | Samantaray | G06F 11/368 717/122 |
| 2012/0016831 A1* | 1/2012 | Proctor | G06N 5/025 706/47 |
| 2012/0197887 A1* | 8/2012 | Anderson | G06F 17/30321 707/736 |
| 2013/0139003 A1* | 5/2013 | Patwardhan | G06F 11/3684 714/32 |
| 2013/0254318 A1* | 9/2013 | Colar | H04L 51/22 709/206 |
| 2014/0165027 A1* | 6/2014 | Herbert | G06Q 10/063112 717/101 |
| 2014/0172512 A1* | 6/2014 | Chandra | G06Q 10/0637 705/7.37 |
| 2014/0222493 A1* | 8/2014 | Mohan | G06Q 10/06316 705/7.26 |
| 2014/0279810 A1* | 9/2014 | Mann | G06Q 30/00 706/47 |
| 2015/0178625 A1* | 6/2015 | Berlandier | G06Q 10/067 706/11 |
| 2015/0286969 A1* | 10/2015 | Warner | G06Q 10/0633 705/7.27 |

OTHER PUBLICATIONS

NPL—Original Software-Application Testing Best Practices—2010 Located at: http://origsoft.com/wp-content/uploads/2014/07/application_testing_data_strategy_wp.pdf.*

NPL—T-Plan-Developing Java Test Scripts—2012, located at http://www.t-plan.com/robot/docs/v2.0ee/api/docs/javatestscripts.html.*

Adir, Title: "Dynamic Test Data Generation for Data Intensive Applications", HVC 2011, LNCS 7261, pp. 219-233, 2012. Springer-Verlag Berlin Heidelberg 2012.*

* cited by examiner

UNIT TEST AUTOMATION FOR BUSINESS RULES AND APPLICATIONS

CROSS-REFERENCE TO RELATED APPLICATIONS

Pursuant to 35 U.S.C. §119(e), this application claims priority to the filing date of U.S. Provisional Patent Application No. 62/009,071, filed on Jun. 6, 2014. The contents of the previously filed application are hereby incorporated by reference in their entirety.

TECHNICAL FIELD

The present application generally relates to unit test automation for business rules and applications and more specifically to a Java framework for a Unit Test Automation tool to run flexible Pegasystems® RULES Process Commander (PRPC) test cases.

BACKGROUND

A service provider, such as a payment provider may wish to integrate Pegasystems®, Inc.'s software and business process management systems/platforms. For example, Pega® RULES Process Commander (PRPC) is software provided by Pegasystems®, Inc. for the purpose of business process management solutions, and in particular to organize their business rules into one platform. Thus, the service provider may organize business processes (e.g., corporate governance, accounting, recruitment, technical support, etc.) into one system that may streamline and simplify the execution of those processes. PRPC consists of two parts, the PegaRULES, which consists of a business rules engine that executes one or more business rules. Additionally, Process Commander consists of layers of pre-configured rules for a business and may develop and customize business applications, process, and platforms using the business rules. However, when implementing PRPC into a current businesses systems and software, PRPC only offers limited automated unit testing that allow for a developer to test only a few rule types of numerous rule types when building and customizing the business processes of the business. Moreover, when a test case is created for implementing a new business rule, such as rules to be implemented in a business process, the data is statically bound/saved to the test case and data cannot be dynamically entered to the automated unit testing mechanism.

Figure 1:
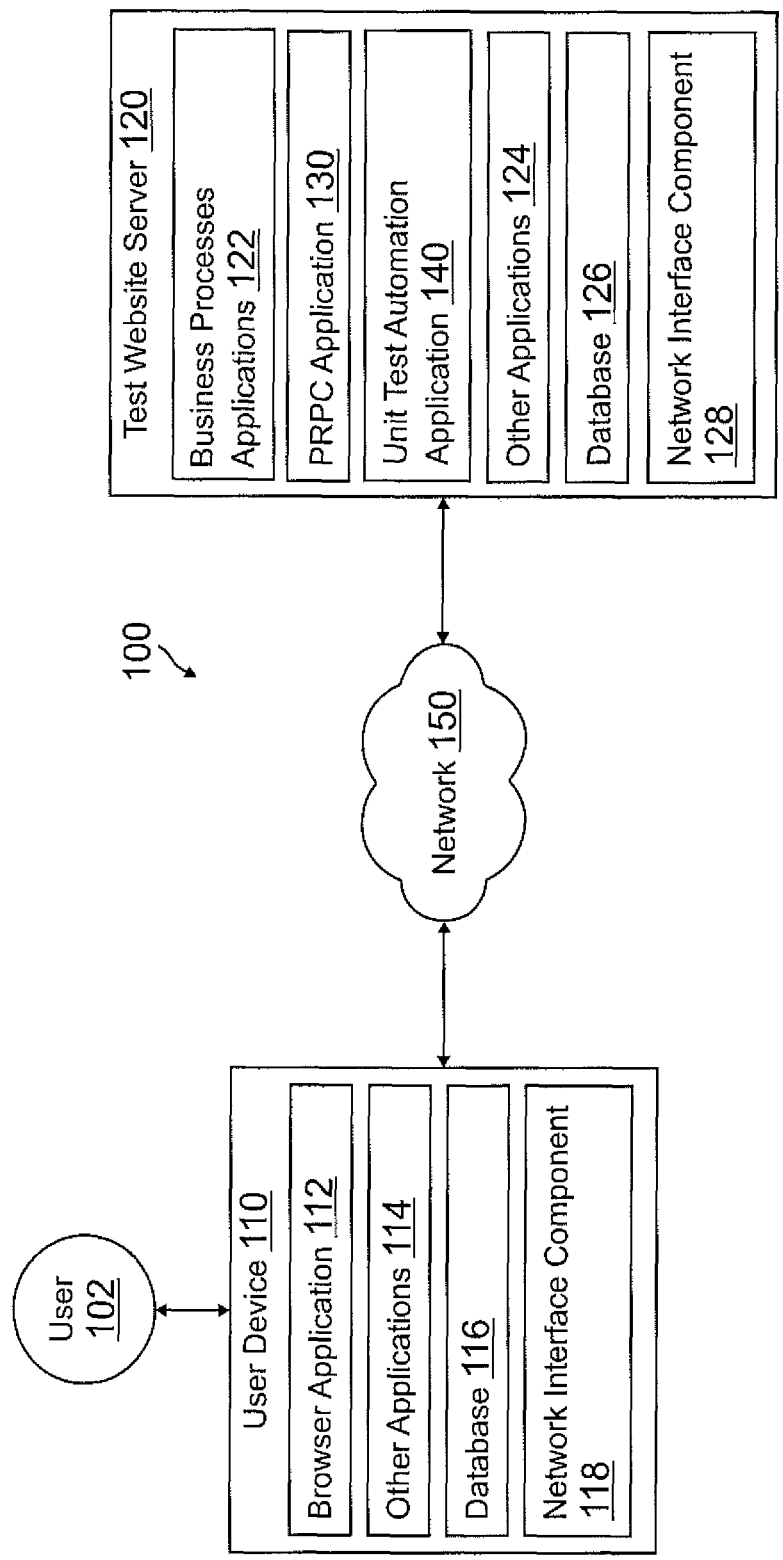
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

An automated unit testing (AUT) mechanism may be provided based on a Java framework for PegaRULES Process Commander (PRPC). PRPC allows a business to collect their business rules into one platform. Thus, business processes may be constructed out of these business rules into business process applications and platforms. However, unit test automation may be required to ensure the implementation of the business rules into the business process application and correct execution of the business rules in an application or platform through test data. Unit test automation may expedite the testing by automating the testing instead of manual entry. Thus, the AUT mechanism may provide for application testing of business rules that define business applications and/or platforms. For example, during a financial business process of an application, a developer for the application may implement one or more business rules into an application for use by a service provider in the financial business process. Thus, in order to test the application the developer may require an AUT mechanism that tests and validates business rules using test data, for example, by testing for implementation of a business rule in the process/application. The AUT mechanism may correspond to a Java framework, which is implemented on the step of the PRPC rule type "Activity."

Thus, a user may generate or modify a business application/platform using business rules within the application/platform. The AUT mechanism/framework may correspond to an interface or a portal where a user can run test cases for rule types to be implemented in a business process application. The AUT mechanism may provide for reuse of test cases and dynamic data entry in the test cases. For example, the AUT mechanism may be constructed to enter rule type, name, and class information for a rule with data necessary to execute the business rule, such as test data/information. The AUT mechanism may enable the user to select 10 or more rule types for a rule to be implemented in a business application/platform. PRPC may include more than 170 rule types for rules that may be implemented, however, past testing with PRPC may only provide for 5 rule types. Once the test case is created, it may be run to determine if the expected results occur or if there is a failure. Thus, a test case may be generated for a particular rule type and name to determine if the entered rule passes and is thus implemented in the application/platform or if it fails. The AUT mechanism may further enable the user to change test data dynamically and/or after the test case has been executed. Test data normally used in testing a PRPC rule in an application is static. However, using the AUT mechanism, data may be entered dynamically and changed, enabling a test to be rerun with different data after editing the test data. This allows for multiple paths of a business rule to be tested. Thus, the AUT mechanism provides for testing business rules to be utilized by PRPC to build business process applications using dynamically generated and entered data.

The AUT mechanism may determine a reason for failure and present the reason to the user. The user may also make assertions of expected test results when using the test data with the asserted rule type for the business rule in the business application/platform. The user may then view actual test results compared to expected test results to determine whether the business rule has passed or failed the test. The results using the test data may be viewed by the user. The test results may also be deleted by the AUT mechanism to prevent data breaches and loss of confidentiality of test data and test results. The user may also schedule tests using dynamic test data so that developed business rules for business applications/platforms may be automated and continuously integrated into a business's system. Test suites may be generated having multiple tests of at least one business rule developed in PRPC. Thus, the tests may be run in processes of the service provider and may be auto-scheduled to ensure integration of PRPC built and/or modified business rules.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, and a test website server 120 in communication over a network 150. User 102, such as a developer or a test executor of a business process application, may utilize user device 110 to access a portal for unit test automation for PRPC rules in a business process. In certain embodiments, test website server 120 may receive test data, such as a test case and/or test suite of tests having test data for use with a business application, platform, and/or process implementing at least one business rule. Additionally, test website server 120 may execute the test case to determine if the business rule may be implemented in the business process application or if there is a failure to of the business rule using the test data.

User device 110 and test website server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with version control system 120 and/or test website server 120. For example, user device 110 may be implemented as a personal computer (PC), a smart phone, laptop computer, wristwatch with appropriate computer hardware resources, eyeglasses with appropriate computer hardware (e.g. GOOGLE GLASS®), other wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a browser application 112, other applications 114, a database 116, and a network interface component 118. Browser application 112 and other applications 114 may correspond to processes, procedures, and/or applications executable by a hardware processor, for example, a software program. In other embodiments, user device 110 may include additional or different software as required.

Browser application 112 may be used, for example, to provide a convenient interface to permit a user to access test website server 120. In one embodiment, browser application 112 may be implemented as a web browser configured to view information available over the Internet, for example, accessing a website. Browser application 112 may be configured to transmit and receive data over network 150, including receiving webpages and webpage portals, displaying the webpages/portals to user 102, and transmitting user input corresponding to the webpages/portals. In this regard, browser application 112 may display an accessible portal for automated unit test of PRPC rules in PRPC processes. Browser application 112 may receive user input from user 102 corresponding to the portal and transmit the input to test website server 120.

User 102 may utilize browser application 112 to enter business rules to test website server. However, in other embodiments, another developer may enter the business rules to test website server 120 for testing and use by user 102. The business rules may be utilized to develop a business process, such as an application and/or platform used by a business, including a customer service platform. During testing of the business process, such as integration of one or more business rules into the business process, user 102 may be required to run test cases using test data on the business rules. Test cases may test one or more branches of the business rule for use in the business process to determine if the branch(es) are running correctly, thus, pass or fail using the test data. A business rule may include a single business rule (e.g., an assertion for a business practice) or a collection of business rules (e.g., a business rule set) for multiple assertions during a business practice. In normal development of a PRPC application/platform through business rules without using a unit test automation framework provided by test website server 120, the test data is statically bound to the test case an cannot be changed. Moreover, user 102 may only select from 5 rule types for the test case. Thus, test website server 120 provides a unit test automation application 140 to allow for dynamic entry of data into a test case, development of test suites offering a plurality of test cases with dynamic data, and selection of further rule types, as will be explained in more details herein.

Thus, in various embodiments, the user input by user 102 may correspond to a test case for one of created, selected, or customized business rule to be implemented in a business process application. For example, a test case may include to a set of conditions and variables (i.e., test data), which may determine if a business rule for implementation into a business process, application, or platform is working as it was established and coded to do (i.e., if the business rule is properly being executed). The test case may therefore include a selected rule type, name, class, and/or release number (e.g., version) with clipboard information and parameter information to determine if the rule may be properly integrated into the application. The rule type may correspond to a selected type of business rule used for testing the test case data (e.g., the clipboard information and parameter information. User 102 may select the rule type and enter the clipboard and parameter information for running the test case. User 102 may further select to add the test case to a test suite. One or more test cases may be organized into a test suite for execution of all the test cases. Thus, a collection of test cases that each test a business rule in an application may be tested at once using the test suite. The automated unit testing (AUT) mechanism/framework may then execute the test case and dynamically feed in data to generate test results, as will be explained in more detail herein.

Thus, the test case may include test data for execution using the business rule in the business process application. User 102 may enter this input to test website server 120 using browser application 112. Additionally, user 102 may make test result assertions using the AUT mechanism. Test result assertions may correspond to expected test results of the test data using the selected rule type and business rule with the test data. Once the test case(s) are completed, user 102 may view the test results using browser application 112, including whether there was a failure in the application or a failure in implementing the business rule, and what the failure was or what the failure was caused by. User 102 may further view the expected test results compared to the actual test results to see if the test passed or failed the expected results.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150, including for establishment, receipt, and/or verification of encrypted data keys used by test website server 120. Other applications 114 may contain other software programs, executable by a processor, including a graphical user interface (GUI) configured to provide an interface to the user.

User device 110 may further include database 116 which may include, for example, identifiers such as operating system registry entries, cookies associated with browser application 112 and/or other applications 114, identifiers associated with hardware of user device 110, or other appropriate identifiers, such as identifiers used for user/device authentication or identification. In one embodiment, identifiers in database 116 may be used by test website server 120 to identify user 102 and/or user device 110 with a test case and/or test suite executed by test website server 120. Database 116 may further include test data for use in a test case, which may be transferred to test website server 120. In various embodiments, database 116 may include expected and/or actual test results for an execute test case/test suite. However, the expected and/or actual test results may be deleted after execution of a test case by one or more of user device 110 and test website server 120 to prevent loss of data confidentiality in the event of a data breach.

In various embodiments, user device 110 includes at least one network interface component 118 adapted to communicate with test website server 120 over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Test website server 120 may be maintained, for example, by an entity establishing automated unit testing for Pegasystems® PRPC applications and platforms, including integration of business rules in business processes developed using PRPC. Thus, test website server 120 may include features and processes to develop PRPC applications/platforms, or may receive the applications/platforms from another development entity. In various embodiments, test website server may create, manage, and/or integrate one or more business rules for use in business processes, such as PRPC applications/platforms. In this regard, test website server 120 includes one or more processing applications which may be configured to interact with user device 110 to facilitate the testing and implementation of business rules for use in a PRPC application/platform using test data. Test website server 120 may include a business process application that wishes to implement one or more business rules into the business process application. Thus, test website server 120 may be maintained by any entity wishing to perform PRPC integration.

Test website server 120 of FIG. 1 includes a business processes applications 122, a PRPC application 130, a unit test automation application 140, other applications 124, a database 126, and a network interface component 128. Business processes applications 122, PRPC application 130, unit test automation application 140, and other applications 124 may correspond to processes, procedures, and/or applications executable by a hardware processor, for example, a software program. In other embodiments, test website server 120 may include additional or different software as required.

Business processes applications 122 may implement one or more business rules into a business process that corresponds to a collection of activities or tasks for a business. For example, business rules may implement a business strategy so that the strategy can be executed. Business rules may therefore describe the business practices of a business. Thus, business processes applications 122 may implement one or more business processes, such as customer service, financing, accounting, marketing, sales, management structure, etc. Business processes applications 122 may therefore organize the business processes into a workflow so that they may be implemented by the business. When new business rules are added to business processes applications 122, the new business rules should be tested and determined if the business rules can be implemented within business processes applications 122. For example, a new business rule to business processes applications 122 may correspond to a new rule or rule set for customer service, financing, sales, etc.

Business processes and/or business rules to be implemented into business processes applications 122 may correspond to Pegasystems®, Inc.'s PegaRULES Process Commander (PRPC) generated software that collects and implements business rules for a business into one platform and enables the business to create, streamline, automate, and document their business processes. PRPC enables a business to create, manage and/or implement business rules, which may be used to design workflows using the business rules into a business process for implementation as or into a business application or platform. Thus, PRPC may enable the formation of one or more business processes applications 122. In other embodiments, PRPC may be utilized to change, expand, and/or incorporate one or more business rules into existing business applications and/or platforms.

Therefore, business processes applications 122 may be created and/or changed by user 102 using PRPC application 130. Additionally, user 102 may utilize unit test automation 140 to test business processes application 122 using test data, for example, by testing business rules for use in business processes application 122. Customer, staff members, management, and affiliates (e.g., clients, vendors, etc.) of a business corresponding to test website server 120 may utilize business processes application 120 to view, manage, and execute business processes for the business.

PRPC application 130 may correspond to business process management platform that may align the business processes of an organization to the wants and needs of clients, staff members, management, etc. Thus, PRPC application 130 may receive and collect the business rules for a business, generate business processes using workflows of business rules, and create and manage business applications or platforms using the business processes. PRPC application 130 may include PegaRULES engine that executes the business rules in a runtime production environment. Thus, PegaRULES engine may correspond to software that defines the business rules of the business, including verification of the business rules definition, and well as defining relationships between rules. PegaRULES may provide business rules for a business, or may be utilized to create and manage business rules for a business. In this regard, PegaRULES enables a business to create business rules for use in a workflow to define some business process that may be added to an existing business application/platform or used to generate a business application/platform. Thus, PegaRULES provides for a business rules engine (BRE) for use in managing business rules for a business.

PRPC application 130 may further include a Process Commander that provides some base level/platform of pre-configured rules that may be utilized as a foundation to later perform development and customization of business processes from the business rules provided, created, and/or managed using the PegaRULES engine. Process Commander of PRPC application 130 may be utilized to generate new business processes, applications, and/or platform such as those included in business processes applications 122. Process Commander PRPC application 130 may also be used to integrate and/or update business processes application 130 using business rules of PRPC application 130. In various embodiments, Process Commander may build business processes using the business rules of PRPC application 130. The business processes may be used in existing business applications/platforms or for generating new business applications/platforms. In this regard, Process Commander provides for utilizing the BRE of PRPC with business process management (BPM) to manage the business processes of a business.

Unit test automation application 140 may correspond to an application configured to test business rules for incorporation into business processes generated using PRPC application 130. For example, a developer may utilize PRPC application 130 to generate one or more business rules for business processes applications 122. However, when implementing business rules from PRPC application 130 to business processes applications 122 automated unit testing (AUT) may be required to execute test cases for a business rule to be implemented and test data, such as conditions or variables for the business rule when implemented into business processes application 122. A test case may determine if the business rule is properly implemented. Thus, a test case may correspond to a test to determine whether various sections of code for business processes application 130 that implement a business rule are behaving properly (e.g., if the code for the business rule is functioning properly and as expected).

Unit test automation application 140 may utilize a Java framework that operates on PRPC application 130. In particular, unit test automation application 140 may run from the PRPC rule type "Activity," and provide for entering a business rule and test data. When entering the business rule, user 102 may select a business rule type, a rule name, a rule class, and a version number for the rule (e.g., selection of the coded business rule). Thus, unit test automation application 140 may allow for test case creation, including naming and identifying the business rule. Once a business rule is entered, test data may be entered to the test case. Test data may comprise clipboard information and parameter information entered by user 102. Unit test automation application 140 may dynamically enter the test data so that data may be changed after initial entry and when running the test case. For example, test data may be received dynamically from user device 110 and/or another source and the test may be executed using the dynamic test data. Thus, when running a test case from the Java framework, data may be fed into the test case while running the business rule of the selected rule types and a comparison to expected results may be determined. Data may be dynamically generated and fed into the test case, for example as the data becomes available and/or asynchronously changed and updated. Thus, unit test automation application 140 may enable dynamic test data to be used in a test case. Unit test automation application 140 may edit the data used for PRPC test cases, such as after a test case has been executed so that another test case may be executed using the same business rule in a business process application however with new parameters and/or test data. Moreover, unit test automation application 140 may allow for multiple test cases to be run and/or scheduled, such as a test suite having a plurality of test cases that have been executed or for execution. The test suite may allow for automatic scheduling of test cases (e.g., when to execute a test case and with what test data). Thus, unit test automation application 140 allows for continuous integration of PRPC application 130 created business rules and PRPC application 130 built business processes, applications, and/or platform by scheduling execution of test cases and managing test suites having multiple test cases.

Additionally, unit test automation application 140 may include an assertion mechanism that enables a developer to make test result assertions. The assertion mechanism allows the developer to enter expected test results after execution of a test case. The expected test results may include an expected result from executing the test data on one or more business rules (e.g., a business rule or a business rule set). Additionally, unit test automation application 140 may allow for receiving and viewing test results. The actual received test results may be compared to the expected test results to determine if the test case passed of failed (e.g., if the business rule is properly coded or executing properly using the test data). Unit test automation application 140 may further delete test data after execution of a test case to prevent the release of test data in the event of a data breach. Moreover, user 102 may delete test cases and/or test suites using unit test automation application 140.

In various embodiments, test website server 120 includes other applications 124 as may be desired in particular embodiments to provide features to test website server 120. For example, other applications 124 may include security applications for implementing server-side security features, programmatic server applications for interfacing with appropriate application programming interfaces (APIs) over network 150, or other types of applications. Other applications 124 may contain software programs, executable by a processor, including a graphical user interface (GUI), configured to provide an interface to a user.

Additionally, test website server 120 includes database 126. Identifiers for users, developers, and/or businesses may be stored to database 126. Database 126 may include business rules, business processes, and/or applications/platforms for use by a business. Information in database 126 may be utilized to determine business rules, such as through business rules definitions. Thus, database 126 may be used to create, define, and/or modify business rules for use in developing business processes, applications, and/or Platforms. Additionally, information in database 126 may be utilized to construct business process, such as through the implementation of business rules, and determine or modify applications/platforms to implement the business processes.

In various embodiments, test website server 120 includes at least one network interface component (NIC) 128 adapted to communicate user device 110 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
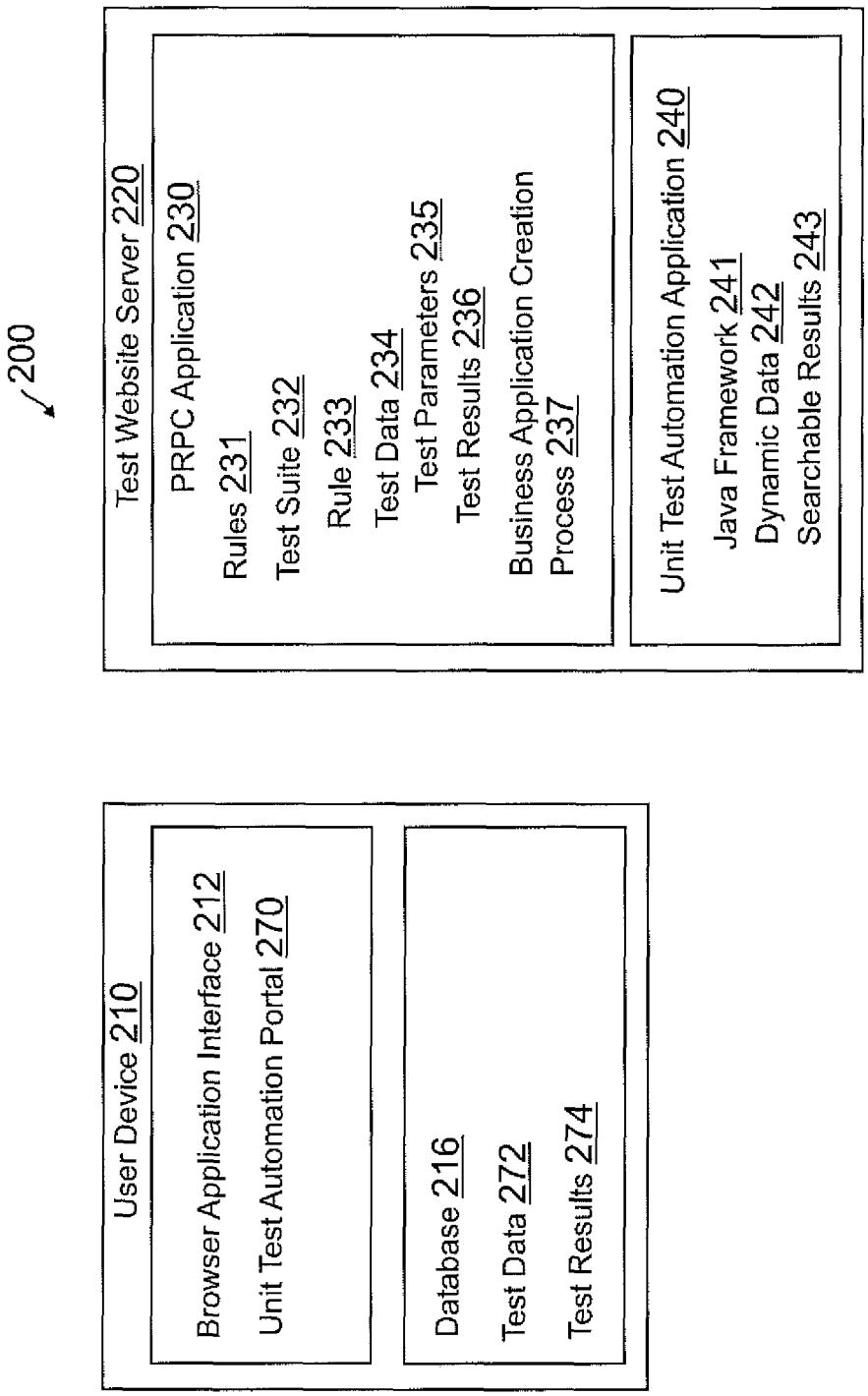
FIG. 2 is an exemplary system environment showing a test website server offering unit test automation for PRPC applications, according to an embodiment.

FIG. 2 is an exemplary system environment showing a test website server offering unit test automation for PRPC applications, according to an embodiment. Environment 200 of FIG. 2 includes a user device 210 and a test website server 220 corresponding generally to user device 110 and test website server 120, respectively, of FIG. 1.

User device 210 includes a browser application 212 and a database 216 corresponding generally to the described features, functions, and processes of browser application 112 and database 116, respectively, of FIG. 1. In this regard, browser application 212 includes unit test automation portal 270 displaying an AUT portal for an AUT mechanism/framework offered by test website server for use with business rule implementation of PRPC rules. Unit test automation portal 270 may correspond to a website or other accessible portal where a user (not shown) of user device 210 may execute test cases and test suites for testing PRPC code (e.g., business rules created, modified, or otherwise managed using a PRPC application). Unit test automation portal 270 may also be utilized to test rule sets and/or implementation of business rules in business processes. Thus, user device 210 further includes database 216 having test data 272 and test results 274. Test data 272 may correspond to clipboard data/information submitted to test website server 270 for use in a test case by the AUT mechanism/framework. Moreover, test data 272 may include parameters for the test case. User device 210 may receive test results 274, which may be displayed to the user and stored to database 274. User device 210 may also delete test data 272 and test results 274 after execution of a test case/suite and viewing test results 274 to prevent loss of confidentiality of test data 272 and/or test results 274.

Test website server 220 includes a PRPC application 230 and a unit test automation application 240 corresponding generally to the described features, functions, and processes of PRPC application 130 and unit test automation application 140, respectively, of FIG. 1. PRPC application 230 includes various processes, information, and features to generate and manage business rules, processes, applications, and platforms. In this regard, PRPC application 230 includes rules 231, test suite 232, and business application creation process 237. Rules 231 may correspond to a set of predetermined, created, and/or modified rules used by Pegasystems® PRPC platform (e.g., PRPC application 230) to determine workflows for a business' processes, generated software processes, and create or modify business applications and/or platform using the software processes.

Thus, the user of user device 210 may enter or modify rules 231 and wish to test the rules for proper coding and results. Thus, PRPC application 230 includes test suite 232 for testing of rules 231 to be implemented in a business process. In other embodiments, test suite 232 may correspond to a single test case. Test suite 232 includes a rules 233, test data 234 having test parameters 235, and test results 236. As previously discussed, rule 233 may correspond to a business rule for testing using test data 234. Rule 233 may correspond to a designated rule having a rule type, name, and/or class. Rule 233 may also have a version number corresponding to the release number or series for rule 233. Test data 234 for use with rule 233 may include test data received from user device 210 and/or another entity for use with testing rule 233. As previously discussed, test data 234 may be dynamic (e.g., changing and/or updated) and may be fed into unit test automation application 240 dynamically and during execution of a test case. However, as PRPC application 230 may normally statically bind test data to a test case, test data 234 may not appear as dynamic data during execution of test suite 232 to PRPC application 230. Test data 234 include test parameters 235, such as clipboard values, data, and/or information and parameters used to execute a test case on rule 233. Test parameters 235 may include the information necessary to determine if rule 233 is properly coded and implemented for use in a business process. Thus, test data and test parameters 235 may be used to generate test results 236. Test results 236 may include the results from executing test data 234 on rule 233, such as whether the rule passed or failed (e.g., is properly coded) and may be utilized to determine if rule 233 is behaving properly (e.g., giving the expected result). Business application creation process 237 may then be utilized by a user to generate business processes and create or modify business applications and/or platforms with the business processes. In this regard, business application creation process 237 may access and utilize one or more of rules 231 to create the business processing using a workflow of business rules mapped by the user.

Unit test automation application 240 may be utilized to enter the test case/suite to PRPC application 230. Thus, unit test automation application 240 includes a Java framework 241, dynamic data 242, and searchable results 243. Java framework 241 may correspond to a framework or mechanism that may be used to execute automated unit tests on rule 233 of PRPC application 230. Java framework 241 may receive a selection of rule 233 to execute a test case with (e.g., rule name, class, and/or version number. Java framework 241 may also receive a selection of a rule type, which may correspond to one of the more than 170 PRPC rule types. Java framework 241 may allow for the selection and entry of dynamic data 242, such as clipboard information and parameter information. Dynamic data 242 may be edited and may be fed in dynamically from one or more sources. This allows for flexible testing of rule 233 using dynamic data, such as testing for more than one branch of rules 233. For example, dynamic data 242 may allow for testing of both a yes and no response to rule 233 (e.g., a set of declarative rules having two separate courses of action), allowing a developer to view test results for two conditional paths of a set of declarative rules. Java framework 241 may also include options to enter expected test results. Thus, searchable results 243 may include test results 236 with expected test results in a searchable form so that a user of user device 210 may browse results of a test case and/or test suite to determine the integration of rule 233.

Figure 3:
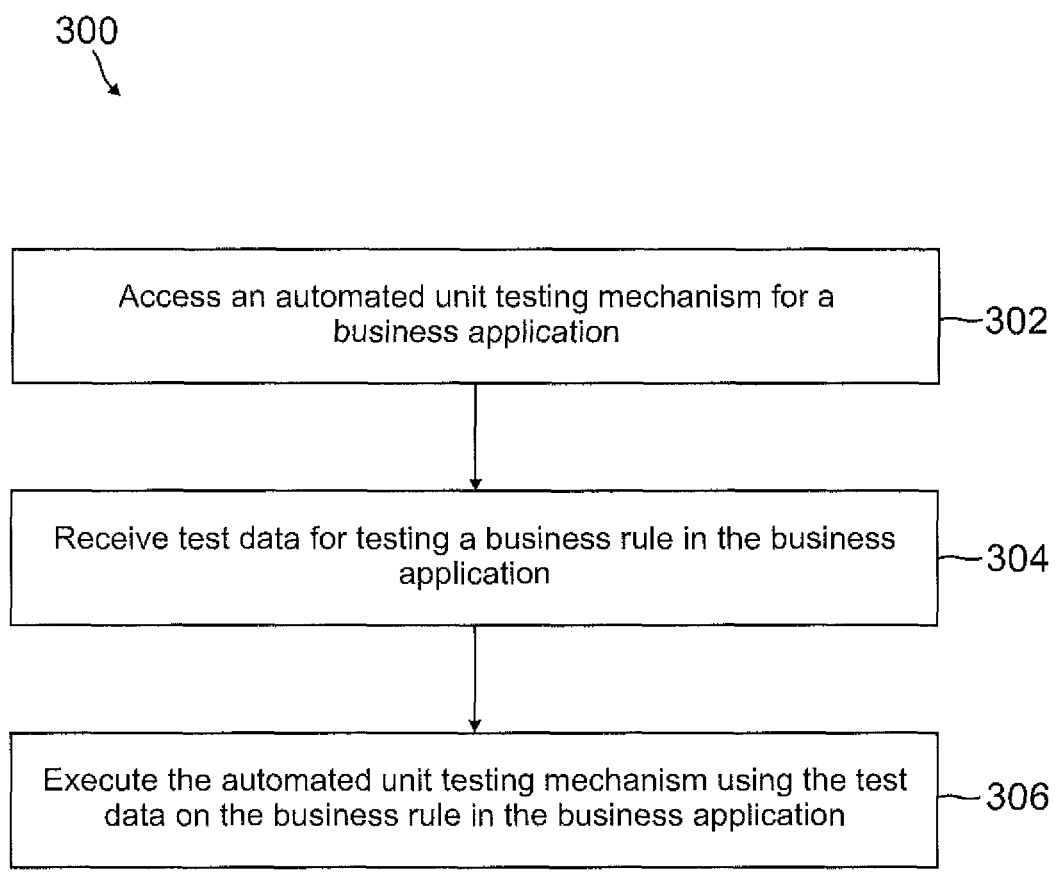
FIG. 3 is a flowchart of an exemplary process for unit test automation for business rules and applications, according to an embodiment.

FIG. 3 is a flowchart of an exemplary process for unit test automation for PRPC rules and applications, according to an embodiment. Note that one or more steps, processes, and methods described herein may be omitted, performed in a different sequence, or combined as desired or appropriate.

An automated unit testing mechanism is accessed for a business application, at step 302. The automated unit testing mechanism may be utilized to test a business rule for use in the business application. The business rule may be created and/or modified using a business application creation process, engine, application, or platform, such as Pegasystems® PRPC. The automated unit testing mechanism may comprise a Java API configured to communicate with PRPC or the business application creation process. Additionally, prior to accessing the automated unit testing framework, a platform, such as the business application, may be accessed, wherein the platform is generated by at least one user (e.g., a developer) using the business application creation process. The platform/business application may correspond to a customer service or support application/platform for use with a business.

At step 304, test data for testing a business rule in the business application is received. The test data may be received from a user device and may be accessed from a memory of a server. The test data may comprise dynamic test data entered by a user of the user device, another user utilizing another user device, and/or another server. The dynamic test data may change at least one of a test parameter and a clipboard value in the test data. Thus, second test data may be received, which may dynamically edit the original test data to generate dynamic test data.

The automated unit testing mechanism is executed using the test data on the business rule in the business application, at step 306. The automated unit testing framework may be executed automatically using the test data according to a schedule. In various embodiments, a test suite may include the test data for testing the business rule, and may be dynamically received. Thus, the test data and test cases in the test suite may be executed automatically, such as according to the schedule. Test results may be received from executing the automated unit testing framework using the test data with the business rule. Moreover, an assertion tool may be used to assert expected test results, wherein the received test results are compared to the expected test results. Once the test results are received, the test data and/or the test results may be deleted.

Figure 4:
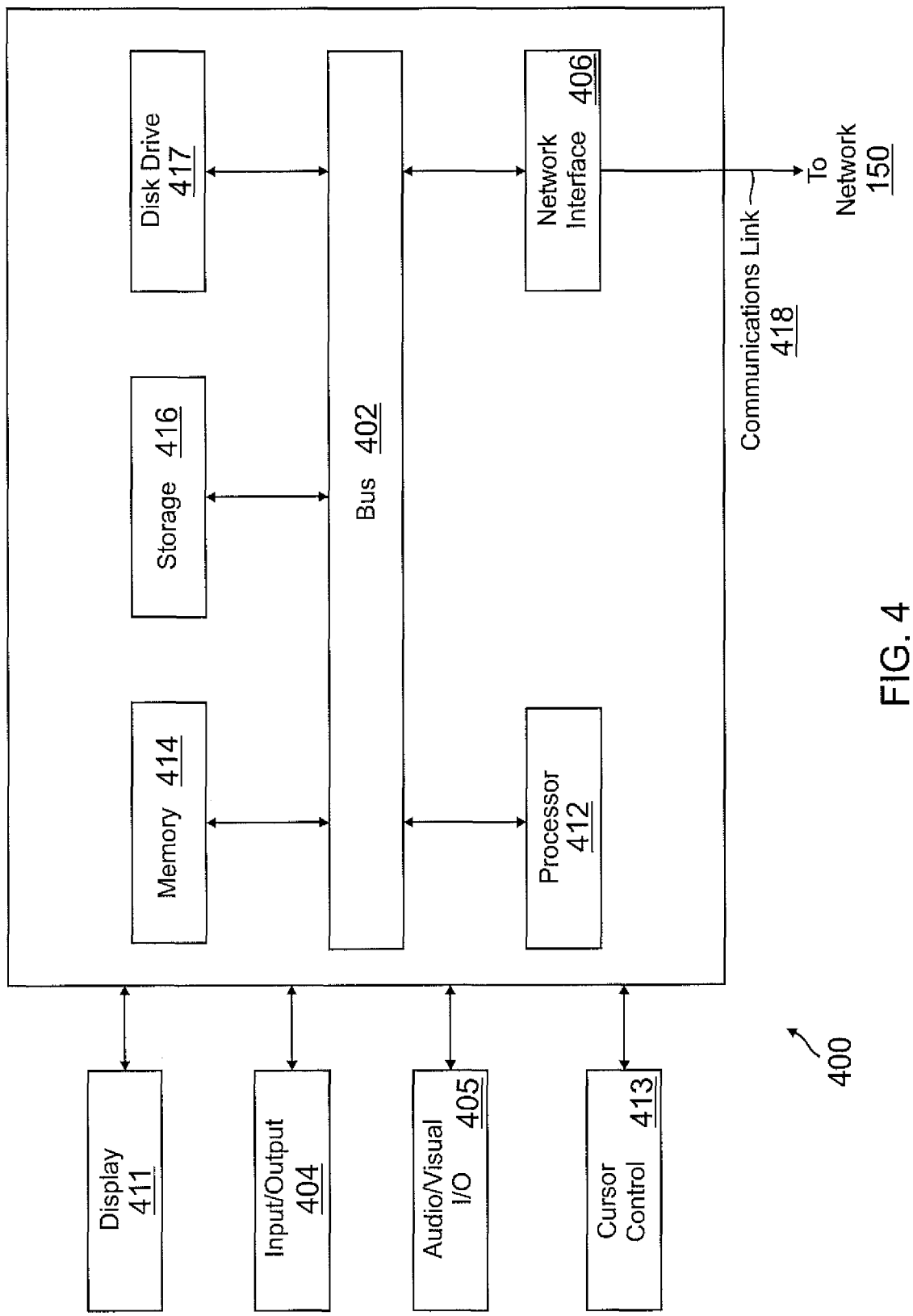
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant device, or a service provider server via network 150. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   one or more processors; and
   a non-transitory memory having stored thereon instructions that are executable by the one or more processors to cause the system to perform operations comprising:
      loading an automated unit test for at least one business rule corresponding to a business process generated by a business application creation process;
      accessing initial test input data for a test case, the initial test input data comprising one or more parameters to test the at least one business rule, and the test case including a rule type, name, class, release number, and parameter information for the business rule;
      executing the automated unit test using the initial test input data as an input to the automated unit test;
      based on receiving dynamic test input data from a user prior to completion of the automated unit test, the dynamic test data including at least one altered data input value for at least a first parameter of the one or more parameters that is different from a corresponding data input value in the initial test input data for the first parameter, updating the automated unit test to execute a test case using the at least one altered data input value for at least the first parameter, the dynamic test input data including clipboard information for the test case;
      continuing the executing of the automated unit test using the at least one altered data input value;
      providing a comparison of expected test results to test results from the continuing the executing the automated unit test using the at least one altered data input value; and
      using the comparison of the expected test results to the test results and business rule information for the test case, determining if the business rule can be integrated into a business application corresponding to the business process.

2. The system of claim 1, wherein receiving the dynamic test input data comprises receiving a clipboard value.

3. The system of claim 1, wherein the automated unit test comprises a Java API configured to communicate with the business application creation process.

4. The system of claim 1, wherein the business process comprises a customer support platform, and wherein the at least one business rule comprises a declarative rule for customer support within the customer support platform.

5. The system of claim 1, wherein the operations further comprise determining whether the at least one business rule is implemented for the business process based on the comparison of expected test results to the test results from the automated unit test.

6. The system of claim 1, wherein the automated unit test is executed automatically using the initial test data according to a schedule.

7. The system of claim 1, wherein the operations further comprise logging the dynamic test input data received from the user.

8. The system of claim 1, wherein continuing execution of the automated unit test using the at least one altered data input value comprises executing a test scenario in which the at least one altered data value is used as a substitute user-submitted data value from an online web page submission form.

9. A method, comprising:
   accessing, by a computer system, an automated unit test to test a platform comprising a business rule generated by a business application creation process;
   receiving, by the computer system, a test suite comprising initial test data for testing the business rule for use in the platform, the test suite including a test case having a corresponding rule type, name, class, release number, and parameter information for the business rule;
   processing, by the computer system, the initial test data in the test suite using the automated unit test;
   receiving, by the computer system, updates to the initial test data comprising a plurality of dynamic data items entered by a user as input data for the automated unit test prior to completion of the automated unit test, wherein the plurality of dynamic data items comprise a plurality of values for a plurality of test parameters, wherein the plurality of values differ from a plurality of different values present in the initial test data for the plurality of test parameters, and wherein at least one of the plurality of dynamic data items comprises clipboard information for the test case;
   executing, by the computer system, the automated unit test using the initial test data and the updates comprising the plurality of dynamic data items entered as input data for the automated unit test;

providing, by the computer system, a comparison of expected test results to test results based on the plurality of dynamic data items; and using the comparison of the expected test results to the test results and business rule information for the test case, determining if the business rule can be integrated into a business application corresponding to a business process created via the business application creation process.

10. The method of claim 9, wherein the updates comprising the plurality of dynamic data items appear as statically bound data, rather than dynamic data, to the an automated unit test.

11. The method of claim 9, wherein at least one of the plurality of dynamic data items corresponds to a different scenario specified in the test suite.

12. The method of claim 9, wherein the platform comprises a customer service platform for a payment provider, and is generated at least in part by the business application creation process.

13. The method of claim 12, wherein executing the automated unit test using the initial test data causes one logical branch of the business rule to be tested and executing the automated unit test using the updates comprising the plurality of dynamic data items causes at least one different logical branch of the business rule to be tested.

14. The method of claim 9, further comprising authenticating a user device from which the plurality of dynamic data items are received prior to the executing.

15. The method of claim 9, wherein the initial test data appears as statically bound to the automated unit test.

16. The method of claim 9, further comprising receiving one of the dynamic data items based on new data that was previously unavailable becoming available during execution of the test suite.

17. A non-transitory machine-readable medium having stored thereon machine-readable instructions executable to cause a machine to perform operations comprising:

loading an automated unit test for at least one business rule corresponding to a business process generated by a business application creation process;

accessing initial test input data for a test case, the initial test input data comprising one or more parameters to test the at least one business rule and the test case including a rule type, name, class, release number, and parameter information for the business rule;

executing the automated unit test using the initial test input data as an input to the automated unit test;

based on receiving dynamic test input data from a user prior to completion of the automated unit test, the dynamic test input data including at least one altered data input value for at least a first parameter of the one or more parameters that is different from a corresponding data input value in the initial test data for the first parameter, updating the automated unit test to execute a test case using the at least one altered data input value for at least the first parameter, the dynamic test input data including clipboard information for the test case;

continuing the executing of the automated unit test using the at least one altered data value;

providing a comparison of expected test results to test results from the continuing the executing the automated unit test using the at least one altered data input value; and using the comparison of the expected test results to the test results and business rule information for the test case, determining if the business rule can be integrated into a business application corresponding to the business process.

18. The non-transitory machine-readable medium of claim 17, wherein executing the automated unit test comprises executing one or more test scenarios against a web-based server application.

19. The non-transitory machine-readable medium of claim 17, wherein updating the automated unit test causes execution of a test branch not executable based on the initial test data.

* * * * *